Sept. 19, 1961 W. H. HOWELL ET AL 3,000,079

TUNER AND METHOD FOR MAKING SAME

Filed May 5, 1955 2 Sheets-Sheet 1

INVENTORS.
William H. Howell
Harold T. Lyman
BY Oomn, McDougall, Williams & Hersh
Attorneys

TUNER AND METHOD FOR MAKING SAME

Filed May 5, 1955 2 Sheets-Sheet 2

INVENTORS
William H. Howell
Harold T. Lyman
BY Oones, McDougall, Williams & Hersh
Attorneys United States Patent Office 3,000,079

Patented Sept. 19, 1961

3,000,079

TUNER AND METHOD FOR MAKING SAME

William H. Howell, Fairfield, and Harold T. Lyman, Milford, Conn., assignors to Aladdin Industries Incorporated, Nashville, Tenn., a corporation of Illinois Filed May 5, 1955, Ser. No. 506,174
4 Claims. (Cl. 29—155.56)

One principal object of the present invention is to provide a new and improved slug-type tuner having a ribbon-like coil which is mounted within a supporting form so that a movable tuning slug may be disposed within the coil and in extremely closely spaced relation thereto.

A further object is to provide a new and improved slug-type tuner having an extremely wide range of frequency coverage.

Another object is to provide a new and improved tuner of the foregoing character which is extremely efficient and serviceable yet is easy to manufacture and low in cost.

It is a further object of the invention to provide a new and improved method of making a slug-type tuner of the foregoing character.

Further objects and advantages of the invention will appear from the following description, taken with the accompanying drawings, in which.

Figure 1:
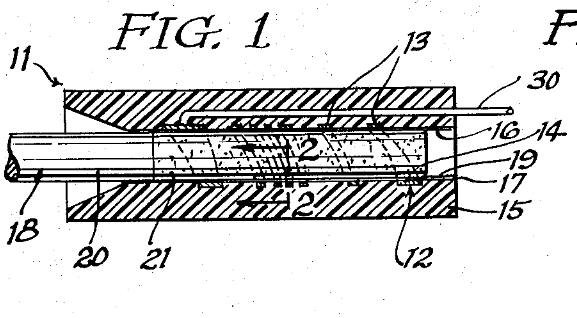
FIGURE 1 is a longitudinal sectional view of an exemplary tuner constituting an illustrative embodiment of the invention.
Figure 2:
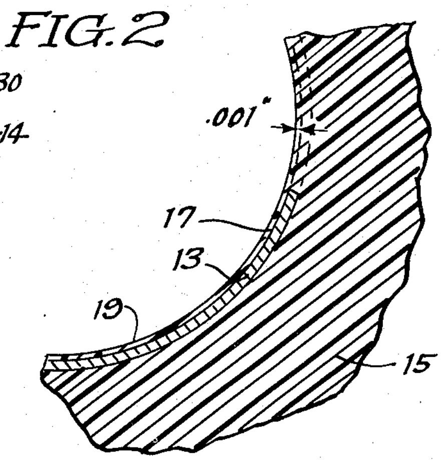
FIG. 2 is a greatly enlarged fragmentary cross-sectional view of the tuner, taken generally along a line 2—2 in FIG. 1.
Figure 3:
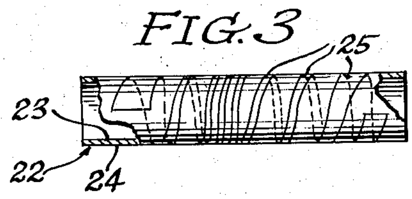
FIG. 3 is an elevational view, partly in longitudinal section, of a cylindrical metal tube with etch-resisting coatings applied thereto, in accordance with an exemplary method of making the tuner of FIG. 1.
Figure 4:
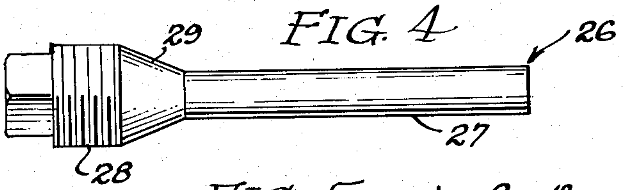
FIG. 4 is an elevational view of a mandrel for receiving the tube of FIG. 3.
Figure 5:
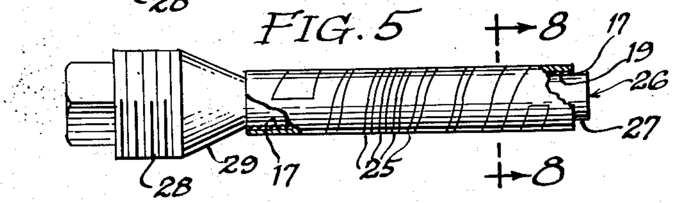
FIG. 5 is an elevational view, partly in longitudinal section, of the tube mounted on the mandrel of FIG. 4.

If the drawings are considered in greater detail, it will be seen that FIGS. 1 and 2 illustrate an exemplary tuner 11, adapted to cover a wide frequency range at high radio frequencies. For example, the tuner 11 may be adapted to cover the very high frequency (VHF) television band from 50 to 216 megacycles. The illustrated tuner 11 comprises a generally helical coil 12, in the form of a helically extending, flat, ribbonlike conductor 13 formed into a plurality of turns. It will be seen that the coil 12 has an inner, cylindrically curved surface element 14 which extends helically along the inside of the turns of the coil. As shown, the ribbonlike conductor 13 varies in width from one end of the coil 12 to the other, the conductor being relatively wide adjacent the ends of the coil, but being relatively narrow along the mid-section of the coil. Moreover, there is a similar variation in the spacing between the turns of the coil 12. This variation in the width of the conductor 13 and the spacing of the turns provides a predetermined, non-linear tuning curve. It will be understood that the width of the conductor and the spacing of the turns may be changed so as to provide any suitable tuning curve.

The coil 12 is supported by a form or body 15 which preferably is made of a synthetic resinous, electrically insulating, plastic material. The plastic material making up the form 15 surrounds the coil 12 and fills the spaces between the turns of the coil. It will be seen that a cylindrical opening 16 extends through the form 15 in coaxial alignment with the coil 12. The cylindrical inner surface element 14 of the coil is flush with the cylindrical inner surface of the opening 16. In the illustrated tuner 11, a thin, electrically insulating film or coating 17 covers the entire inner surface of the opening 16 and the entire inner cylindrical surface 14 of the coil 12. The film 17 is tubular in form and is firmly adherent to the insulating form 15 and the coil 12. Thus, the coil 12 is entirely surrounded by insulating plastic material and may be considered to be embedded in such material.

In order to vary the inductance of the coil 12, a cylindrical tuning slug 18 is slidably disposed within the coil. The slug 18 is of such a diameter as to make a close sliding fit between the slug and the insulating film 17, which has a smooth, internal, cylindrical surface 19 closely receiving the slug 18. A minimum of space is provided between the slug 18 and the internal surface 19. Moreover, the film 17 is made with a minimum of thickness, which may be about .001", for example. Accordingly, the slug moves within the opening 19 in extremely closely spaced relation to the coil 12. As a result, the slug 18 has the maximum possible effect upon the magnetic field, and the inductance of the coil 12. Thus, the width of the tuning range covered by the tuner is enhanced.

As a further measure to increase the tuning range of the tuner 11, the slug 18 may be made in two parts 20 and 21, secured together end to end. The left-hand part 20 may be made of an electrically conductive material, such as silver, copper, aluminum, brass or other metals, while the right-hand part 21 may be made of an electrically insulating, low-loss magnetic material, such as molded and sintered carbonyl iron or ferrite powder. It will be understood that the thin film 17 insulates the coil 12 from the tuning slug 18. The magnetic part 21 of the slug increases the inductance of the coil 12, while the conductive part 20 reduces the inductance. With this arrangement, the tuner 11 will readily cover the VHF television band from 50 to 216 megacycles. It will be understood that the coil 12 is resonated by its own stray capacitances, plus the circuit and inter-electrode capacitances normally present in circuits utilizing the tuner. When employed in the oscillator circuit of a superheterodyne television receiver, the tuner 11 will cover the required range from about 100 megacycles to 260 megacycles. These tuning ranges, and even somewhat wider ranges, may be covered with carbonyl iron as the magnetic material in the tuning slug 18. Still wider tuning ranges can be covered by using ferrite materials in the magnetic portion of the slug 18. Due to the close spacing between the slug 18 and the coil 12, the use of carbonyl materials will usually give adequate tuning range, and will generally provide higher Q and better thermal stability.

FIGS. 3–9 illustrate an exemplary method of making the tuner of FIGS. 1 and 2. It is preferred to form the coil 12 from a thin-walled cylindrical metal tube 22 (FIG. 3), preferably made of copper and having inner and outer cylindrical surfaces 23 and 24. The wall thickness of the tube 22 need be only a few thousandths of an inch.

In order that the tube 22 may be formed into the coil 12 by a chemical etching process, it is preferred to apply an etch-resisting coating 25 in a generally helical pattern on the outside surface 24 of the metal tube 22. The pattern defined by the coating 25 corresponds to the desired shape of the coil 12. A number of processes may be employed to apply the helically-shaped, etch-resisting coating 25 to the outside of the tube 22. For example, the coating 25 may be painted or mechanically printed on the tube 22, using an etch-resisting paint or ink. Such methods are well known in the art of circuit printing. However, it is preferred to form the helically-shaped coating 25 by photographic methods, such as those employed in photographic circuit printing and in photo-engraving. Such photographic printing methods are well known in the art and in themselves form no part of the present invention. However, a preferred method is fully disclosed and claimed in the co-pending applications of Harold T. Lyman, Serial No. 450,750, filed August 18, 1954, and Harold J. Yanosik, Serial No. 450,751, filed August 18, 1954.

In brief, the preferred method of forming the helically-shaped, etch-resisting coating 25 comprises the initial step of applying a continuous coating of a light-sensitive etch-resisting material to the outer surface 24 of the metal tube 22. The material employed may comprise any of the "cold-top" enamels employed in photo-engraving, but preferably it comprises a commercial product marketed by the Eastman Kodak Company, as "Kodak Photo-Resist Lacquer." This material is normally soluble in various organic solvents, such as toluol, xylol and the solvent marketed by the Eastman Kodak Company as "Kodak Photo-Resist Developer." However, the photo-resist lacquer is hardenable by exposure to actinic radiation, and thereby is rendered relatively insoluble.

Accordingly, the photo-resist lacquer is exposed to actinic illumination in the areas to be defined by the final helically-shaped coating 25. The tube 22 is then immersed in an organic solvent, preferably the "Kodak Photo-Resist Developer," to dissolve away the remaining, unilluminated or unexposed portions of the initial coating, leaving only the final helically-shaped coating 25. A stream of water may be employed to wash away the last remaining particles of the dissolved lacquer.

As the next step in the exemplary method, the film 17 is laid down as a thin coating on the inner surface 23 of the metal tube 22. Various commercially available, electrically insulating, etch-resisting, resinous plastic materials, such as epoxy resin, may be employed in the film or coating 17. For example, one suitable commercially available material is that known as "Bisonite K" resin.

A cylindrical mandrel 26 is employed as a temporary supporting member in the next few steps of the exemplary method. It will be seen that the mandrel 26 includes a cylindrical rod-like body portion 27. At one end of the body portion, the mandrel 26 is formed with an externally threaded, enlarged head 28. A tapered, frusto-conical portion 29, is interposed between the body portion 27 and the head 28. In order that the mandrel 26 may be etch-resisting, it is preferred that it be gold-plated or that it be made of an etch-resisting material. The surface of the mandrel 26 is lightly greased to prevent the film 17 from adhering to the mandrel at a later stage in the method. As soon as the film 17 has been applied to the inner surface 23 of the metal tube 22, the tube 22 is slipped over the greased mandrel. It is then preferred to place the mandrel 26 and the tube 22 in an oven heated to about 160° F. in order to cure the "Bisonite K" resin employed in the coating 17. After about thirty minutes, the mandrel 26 and the tube 22 may be removed from the oven.

Figure 6:
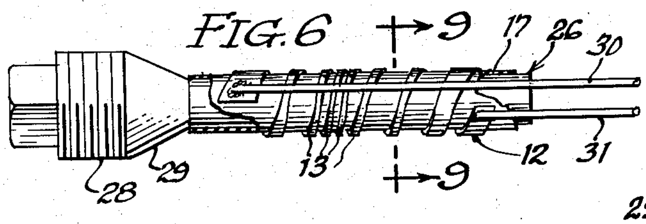
FIG. 6 is a view which shows the structure of FIG. 5 after applying an etching agent thereto, so as to form a ribbonlike coil on the mandrel.

In order to form the coil 12, an etching agent is applied to the metal tube 22, so as to dissolve away all portions of the tube not protected by the etch-resisting coating 25. It is preferred to form the tube 22 out of copper, and for such material a strong solution of ferric chloride is preferably employed as the etching agent. It will be understood that the etching operation is accomplished simply by immersing the copper tube 22 and the mandrel 26 in a bath of the etching solution. The coating 17 inside the tube 22 protects the inner surface of the tube from the etching agent, with the result that the etching agent acts from the outside of the tube so as to dissolve those portions of the tube not protected by the helically-shaped coating 25. The protected portions of the tube 22 remaining undissolved under the coating 25 are adherent to the continuous internal coating 17 and hence are maintained in their original positions. As soon as the unprotected portions of the tube 22 have been dissolved, the mandrel 26 is removed from the etching solution. FIG. 6 illustrates the coil 12 at this stage. The resist coating 25 may be removed with an active solvent, such as acetone, but the coating may be left in place, if desired. As shown, wire leads 30 and 31 may be soldered or otherwise connected to the ends of the coil 12.

In order to imbed the coil 12 in the supporting plastic material which ultimately constitutes the form 15, the mandrel 26, with the coil 12 still received therein, is mounted in a mold 32, which in this instance comprises a tube 33 which is open at its upper end and is closed at its lower end by a cap 34. A threaded axial aperture 35 is formed in the cap to receive the externally threaded head portion 28 of the mandrel. As shown, the mold tube 33 and the cap 34 may be joined by complementary external and internal threads 36 and 37. The internal diameter of the mold tube 33 is made substantially greater than the diameter of the mandrel 26 so as to define a mold cavity therebetween.

Figure 7:
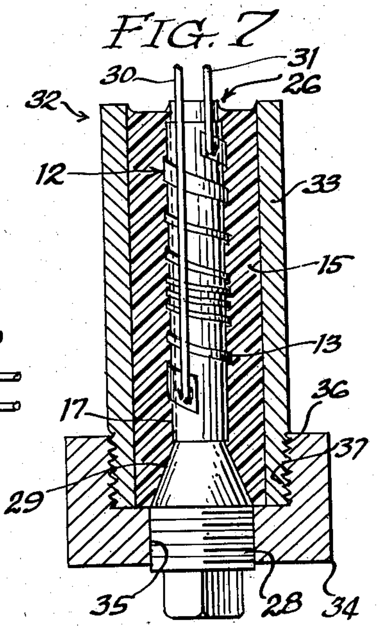
FIG. 7 is a longitudinal sectional view showing the step of casting resinous material around the coil of FIG. 6.
Figure 8:
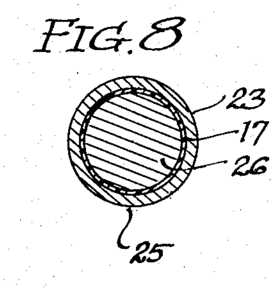
FIG. 8 is a cross-sectional view taken generally along a line 8—8 in FIG. 5.
Figure 9:
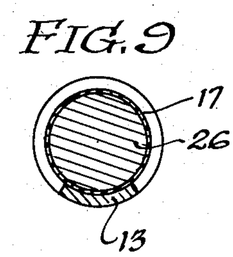
FIG. 9 is a cross-sectional view taken generally along a line 9—9 in FIG. 6.
Figures 10, 11, 12, 13, 14, 15:
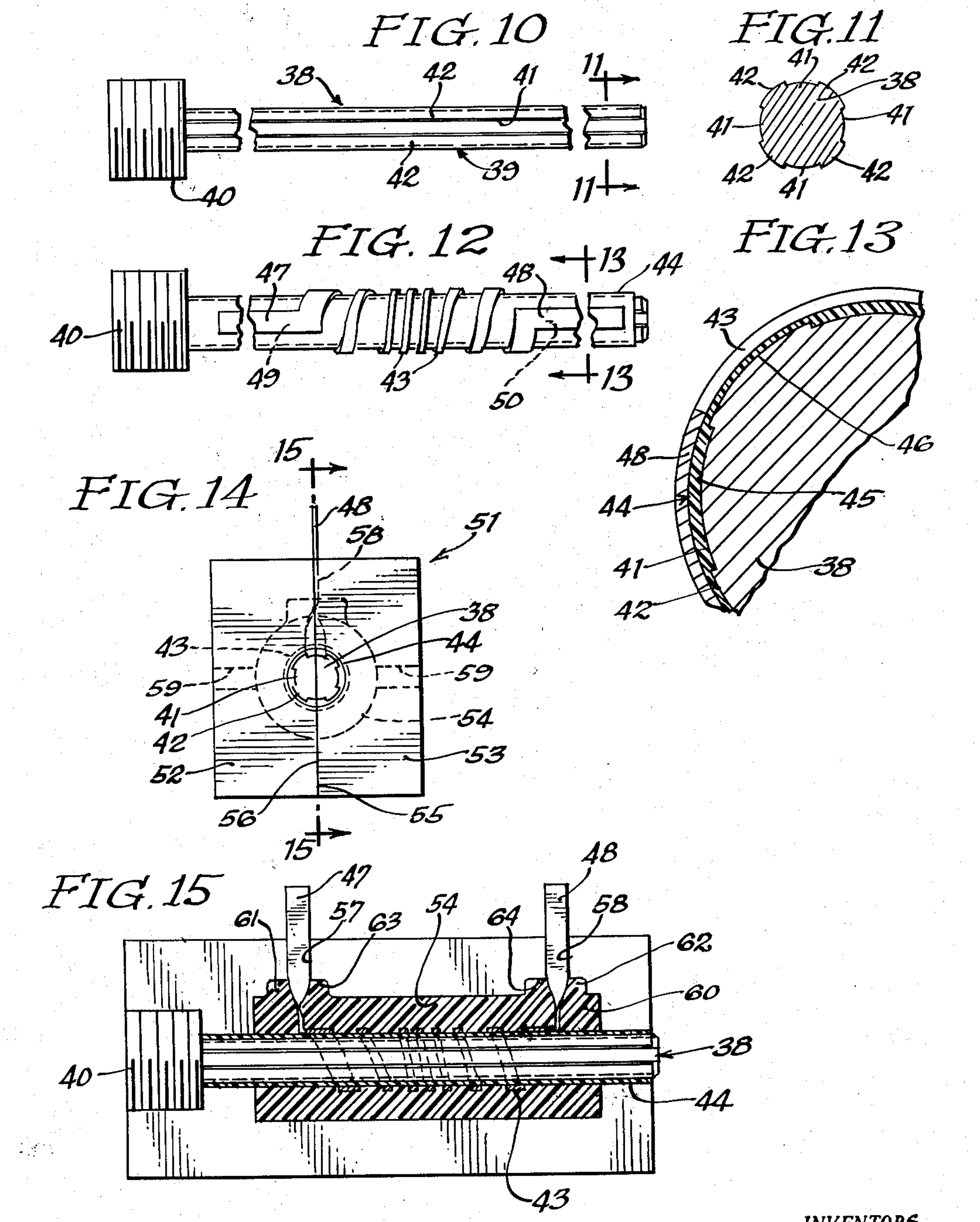
FIG. 10 is an elevational view of a modified mandrel employed in accordance with a modified method of making tuners in accordance with the invention.
FIG. 11 is a cross-sectional view taken through the modified mandrel, generally along a line 11—11 in FIG. 10.
FIG. 12 is an elevational view of the mandrel of FIG. 10, with a modified coil mounted thereon.
FIG. 13 is a fragmentary, greatly enlarged cross-sectional view taken generally along a line 13—13 in FIG. 12.
FIG. 14 is an end view of a mold employed in the modified method, the mandrel and coil of FIG. 12 being shown mounted in the mold.
FIG. 15 is a longitudinal sectional view taken generally along a line 15—15 in FIG. 14.

The supporting form or body 15 of the finished tuner 11 is formed by introducing a liquid epoxy or other suitable casting resin into the mold 32. As shown in FIG. 7, the casting resin, making up the body 15, fills the spaces between the turns of the coil 12 and completely surrounds the outside of the coil. Moreover, the resinous material of the body 15 forms a bond with the coating or film 17 so that the members 15 and 17 are effectively united. Various casting resins are commercially available for use in the body 15. One suitable resin is that marketed commercially as "Bisonite K" resin. This resin may be introduced into the mold 32 in a liquid state and then may be hardened or cured by heating the mold 32 in an oven at about 160° F.

The tuner 11 is completed by removing the body or form 15 from the mold 32 and then withdrawing the mandrel 26 from the opening 19 formed within the film 17. The tuning slug 18 may then be inserted into the opening 19.

Since the insulating film or coating 17 is extremely thin, the tuning slug 18 may be spaced closely to the inside of the coil 12. The diameter of the tuning slug 18 is such that the slug makes a close sliding fit with the opening 19 within the insulating film 17. Because of the close spacing between the slug 18 and the coil 12, the slug has a maximum effect upon the inductance of the coil 12. Accordingly, the tuner 11 has an extremely wide range of frequency coverage.

FIGS. 10–15 illustrate a modified method of making tuners in accordance with the invention. In the modified method, the mandrel 26 is replaced by a mandrel 38 having an elongated generally cylindrical body portion 39 and an enlarged head portion 40. As clearly shown in FIGS. 10 and 11, the body portion 39 is provided with a plurality of angularly spaced longitudinal grooves 41, four such grooves being shown. Relatively raised lands or ridges 42 are defined between the grooves 41.

In the modified method, a coil 43 is formed generally in the same manner as in the first described method. Thus, the coil 43 is made from a thin walled copper tube similar to the tube 22 of FIG. 3, except that the tube may be somewhat longer. An etch-resisting coating in the form of the desired coil 43 is applied to the outer surface of the copper tube. Then, a hardenable epoxy or other resin is applied in liquid form as a coating within the tube. The next step is to slip the copper tube over the mandrel 38. Sufficient liquid resin is employed in the coating to flow into and fill the grooves 41 in the mandrel 38. Then, the mandrel may be placed in an oven to harden the resin coating. The resulting coating is shown at 44 in FIGS. 12 and 13. It will be seen that the grooves and lands 41 and 42 in the mandrel 38 result in the formation of corresponding internal lands and grooves 45 and 46 in the coating 44. In the drawings, the thickness of the coating 44 and the depth of the grooves 41 are exaggerated for clarity of illustration. Actually, the thickness of the coating 44 is preferably about .0015″, and the depth of the grooves may be about .001″. It will be understood that the depth of the internal grooves 46 formed in the coating 44 corresponds to the depth of the grooves 41 in the mandrel 38.

It has been found that the thickness of the coating 44 may be controlled readily and accurately when the grooves and lands 41 and 42 are provided in the mandrel 38. In particular, the provision of the grooves and ridges 41 and 42 results in greater uniformity in the thickness of the coating 44, that is, the thickness of the portions of the coating along the ridges 45. In the formation and curing of the coating 44, the ridges 42 on the mandrel fit closely within the metal tube 22, with only slight clearance therebetween. As a result, the ridges 42 center the mandrel 38 within the tube, so that the mandrel will not become eccentric with respect to the tube, as may easily happen with a smooth, cyindrical mandrel.

The modified coil 43 may be the same as the coil 12 of FIGS. 1–9, except that integral end leads 47 and 48 are formed on the coil 43. These end leads 47 and 48 are formed in the same manner and at the same time as the remainder of the coil. In the illustrated coil 43 as initially formed, the end leads 47 and 48 extend longitudinally from the ends of the coil. As formed, the end leads 47 and 48 are adherent to the coating 44. After the coil 43 has been formed by the etching process described in connection with FIGS. 1–9, the end leads 47 and 48 are peeled off the coating 44 and are bent outwardly, as indicated by dotted and bent lines 49 and 50 in FIG. 12.

The modified coil 43 is embedded in plastic supporting material by mounting the mandrel 38 and the coil 43 in a mold. In the modified method of FIGS. 10–15, a two-part mold 51 is employed. The mold 51 comprises a pair of mold parts 52 and 53 which together define a mold cavity 54 of generally cylindrical form and of substantially greater diameter than the coil 43. The mold parts 52 and 53 have inter-engaging flat surfaces 55 and 56 which project the mold cavity 54.

The ribbonlike terminal leads 47 and 48 of the coil 43 may be brought out of the mold 51 through slots or grooves 57 and 58 formed in one of the mold parts 52 and 53, the grooves formed in the mold part 53 in the case of the illustrated mold.

A hardenable epoxy or other resin is introduced into the mold cavity 54 through one or more openings 59 formed in the mold parts 52 and 53. The plastic resin is then hardened, with or without the application of heating, according to the type of resin employed. It will be understood that the resin thereby provides a supporting, generally tubular body or form 60, in which the coil 43 is embedded. The resinous plastic embedding material forms a firm bond with the coil 43 and the insulating film 44. In this way, the coil is completely surrounded by insulating material, but is effectively carried on the inside of the supporting form 60. In order that reinforcing bosses 61 and 62 may be formed around the inner portions of the end leads 47 and 48, the mold parts 52 and 53 are arranged to define the recesses 63 and 64 at the inner ends of the slots 57 and 58.

After the form 60 has been molded, the mold parts 52 and 53 are separated from the form and the mandrel 38 is withdrawn. The projecting end portions of the film 44, used initially to support the end leads, may be trimmed off flush with the ends of the form 60. The finished coil is then fitted with a composite tuning slug as in the tuner of FIGS. 1–9. Because of the extreme thinness of the fluted film 44, the slug approaches the inside of the coil 43 very closely as it moves through the coil. Accordingly, the slug has a maximum effect upon the inductance of the coil. The result is an extremely wide tuning range. It has been found that the fluted insulating film 44 is highly resistant to wear due to movement of the slug through the coil. The ridges 45 in the internal film or coating 44 act as longitudinal guides for the tuning slug 18. As already indicated, these ridges or guides 45 are of uniform thickness, so that the tuning slug 18 is accurately centered within the coil. This assures uniformity in the finished tuner and obviates any possibility that the slug 18 might rub on the inside of the coil. Such rubbing might cause a short circuit.

In each of the illustrated tuners, the coil is fully embedded in plastic supporting material and hence is effectively protected from mechanical injury and atmospheric corrosion. Because of the extremely small thickness of the internal insulating film; however, the coil 12 is effectively carried on the inside of the supporting form, from an electrical standpoint, rather than on the outside of the form, as in conventional slug tuners. In some cases even the thin insulating film may be dispensed with, particularly where the core is entirely made of, or entirely covered by, an insulating material, such as molded and sintered carbonyl iron ferrite powder.

Since the exemplary methods utilize circuit printing technique, the coils may be formed with great precision, yet at extremely low cost. The method is especially economical inasmuch as none of the steps of the methods involves any machining or difficult manipulative operations.

The exemplary tuners are readily capable of covering the VHF television band and thus have great commercial utility. Moreover, the tuner is extremely small in size and hence may be employed advantageously in modern, compactly designed, television receivers.

Various other modifications, alternative constructions and equivalents may be employed without departing from the true spirit and scope of the invention as exemplified in the foregoing description and defined in the following claims.

We claim:

1. In a method of making a tuner, the steps comprising applying etch-resisting material to the outer surface of a thin-walled cylindrical metal tube in a generally helical pattern, applying a hardening resinous plastic coating to the inner surface of said tube, mounting said tube on a greased mandrel with a plurality of regularly spaced longitudinal grooves thereon alternating with longitudinal ridges, said tube being mounted on said mandrel while said coating is still in a plastic state, said grooves and ridges on said mandrel thereby forming corresponding ridges and grooves in said coating, said ridges on said mandrel fitting closely in said tube with only slight clearance therebetween for centering said mandrel in said tube and thereby providing substantial uniformity in the thickness of the portions of said coating along said ridges, applying an etching agent to said tube and thereby dissolving the portions thereof not protected by said etch-resisting material, the remaining portions of said tube thereby defining a generally helical coil adherent to said coating, mounting said mandrel in a mold, introducing an electrically insulating resinous plastic material into said mold so as to imbed said coil therein, and removing said mandrel from said coil and imbedding plastic material.

2. In a method of making a tuner, the steps comprising applying etch-resisting material to the outer surfaces of a thin-walled cylindrical metal tube in a generally helical pattern with terminal lead-defining portions, applying an etch-resisting hardening electrically insulating coating in a plastic state to the entire inner surface of said tube, mounting said tube on a greased mandrel with a plurality of regularly spaced longitudinal grooves thereon alternating with longitudinal ridges, said tube being mounted on said mandrel while said coating is still in a plastic state, said grooves and ridges on said mandrel thereby forming corresponding ridges and grooves in said coating, said ridges on said mandrel fitting closely in said tube with only slight clearance therebetween for centering said mandrel in said tube and thereby providing substantial uniformity in the thickness of the portions of said coating along said ridges, applying an etching agent to said tube and thereby dissolving the portions thereof not protected by said etch-resisting material, the remaining portions of said tube thereby defining a generally helical coil adherent to said coating and having ribbon-like end leads, bending said leads outwardly, mounting said mandrel in a mold, casting an electrically insulating resinous plastic material in said mold so as to imbed said coil therein, removing said mandrel and said mold from said coil and said plastic material, and disposing a cylindrical tuning slug within said coil and in closely fitting slidable relation with said coating, said ridges on said coating forming electrically insulating wear-resistant guides to support said slug within said coil in closely spaced substantially centered relation thereto.

3. In making a tuner, the method comprising forming a generally helical coil on a greased mandrel with a plurality of longitudinal grooves thereon alternating with longitudinal ridges, while providing a thin electrically insulating hardening resinous plastic coating between said coil and said mandrel, said coating initially being in a plastic state whereby said grooves and ridges on said mandrel are effective to form corresponding ridges and grooves in said coating, said ridges on said mandrel fitting closely in said coil with only slight clearance therebetween for centering said mandrel in said coil and thereby providing substantial uniformity in the thickness of the portion of said coating along said ridges, molding a body of electrically insulating resinous plastic material around said coil to embed said coil in said body and unite said coating with said body, and removing said mandrel from said coating and said body.

4. In combination, a generally cylindrical greased mandrel having a plurality of regularly spaced longitudinal grooves therein alternating with longitudinal ridges thereon, a generally helical coil closely received around said mandrel, a thin electrically insulating resinous plastic layer received between said coil and said mandrel and entering into said grooves, said layer having alternate ridges and grooves interfitting with said grooves and ridges on said mandrel, said ridges on said mandrel fitting closely in said coil with only slight clearance therebetween, said ridges on said mandrel thereby centering said mandrel in said coil, and a body of electrically insulating plastic material disposed around said coil in embedding relation thereto and united with said layer, said mandrel being removable from said layer and said body.

References Cited in the file of this patent

UNITED STATES PATENTS

| | | |
|---|---|---|
| 838,423 | Kitsee | Dec. 11, 1906 |
| 857,583 | Boyle | June 25, 1907 |
| 1,582,683 | Harmon | Apr. 27, 1926 |
| 1,820,240 | Michell | Aug. 25, 1931 |
| 1,857,929 | McFarland | May 10, 1932 |
| 1,859,112 | Silberstein | May 17, 1932 |
| 2,334,584 | Rich | Nov. 16, 1943 |
| 2,459,605 | Warnken | Jan. 18, 1949 |
| 2,552,999 | Pannell et al. | May 15, 1951 |
| 2,607,825 | Eisler | Aug. 19, 1952 |
| 2,662,957 | Eisler | Dec. 15, 1953 |
| 2,666,187 | Ketcham | Jan. 12, 1954 |
| 2,712,048 | Huetten et al. | June 28, 1955 |
| 2,847,708 | Hamjian et al. | Aug. 19, 1958 |
| 2,856,639 | Forrest et al. | Oct. 21, 1958 |

FOREIGN PATENTS

| | | |
|---|---|---|
| 602,492 | Great Britain | May 27, 1948 |
| 130,746 | Australia | Jan. 4, 1949 |